Dec. 7, 1937.  L. J. CHEEK  2,101,609
TRAP
Original Filed Dec. 5, 1935
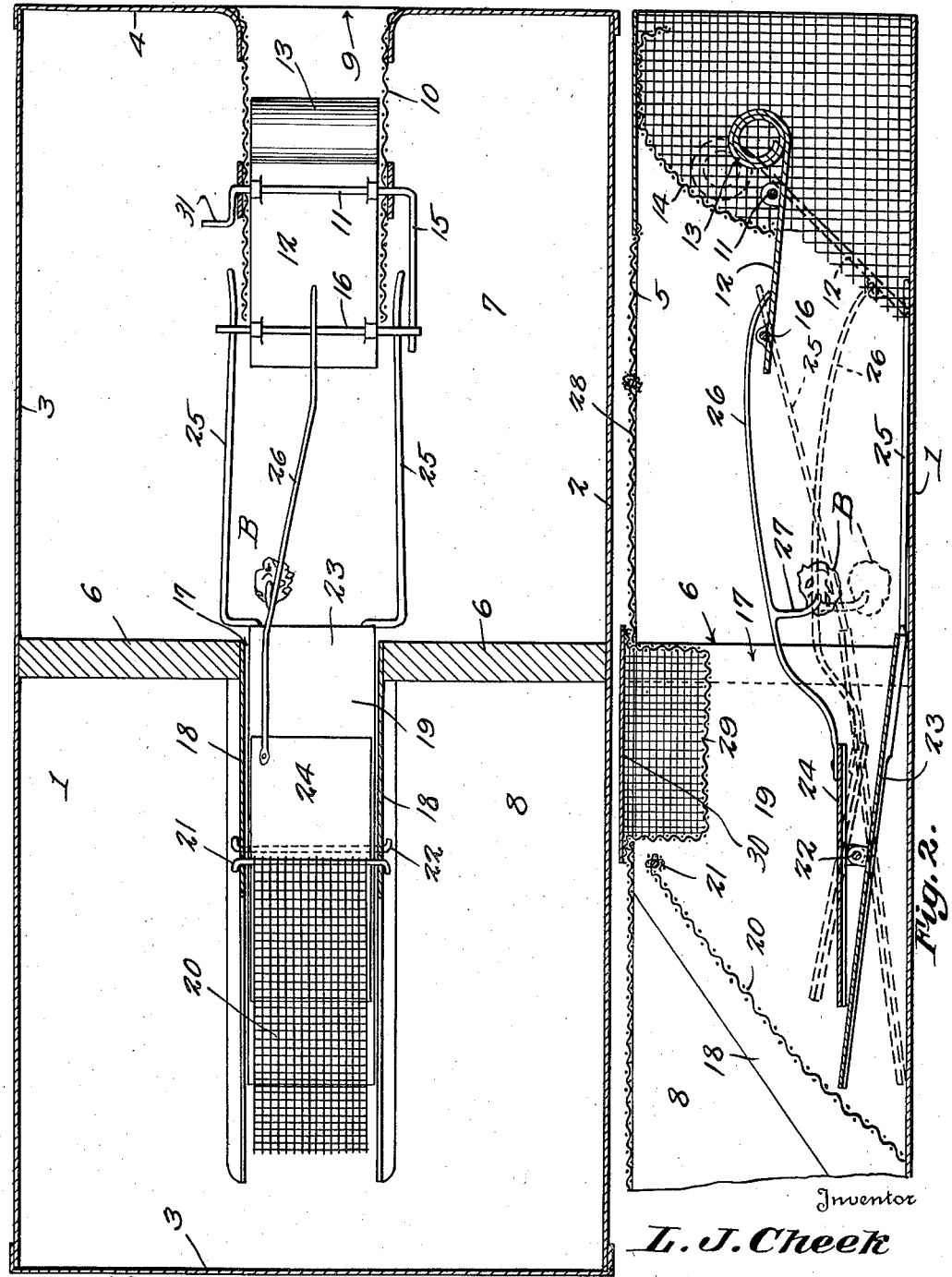
Inventor
*L. J. Cheek*
By *C. A. Snow & Co.*
Attorneys Patented Dec. 7, 1937

2,101,609

UNITED STATES PATENT OFFICE 2,101,609

TRAP

Lightle J. Cheek, Little Rock, Ark., assignor of one-third to H. M. Cheek, North Little Rock, Ark., and one-third to Golden Blount, Searcy, Ark.

Application December 5, 1935, Serial No. 53,071
Renewed September 9, 1937

4 Claims. (Cl. 43—76)

This invention relates to traps for catching rats and other rodents, one of the objects being to provide a trap which will be reset by the trapped rodent so that it is possible to catch a number of the rodents without requiring the attention of the user.

A further object is to provide a trap which is simple in construction and will not easily get out of order.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawing the preferred form of the invention has been shown.

In said drawing

Figure 1 is a horizontal section through the trap.

Figure 2 is a vertical longitudinal section.

Referring to the figures by characters of reference, 1 designates the base of the trap having side walls 2, a back wall 3 and a front wall 4. The walls can be made of sheet metal, wire mesh, or any other suitable material. The top 5 is preferably of a wire mesh.

The interior of the trap is divided by a transverse partition 6 into a bait compartment 7 and a retaining compartment 8. An inlet opening 9 is provided in wall 4 and side guards 10 preferably of wire mesh are provided in compartment 7 at the sides of opening 9, these guards extending from base 1 to top 5. A cross rod 11 is rotatably supported by the guards and pivoted thereon is a gate 12 having a counterbalance 13 at one end while its other end is adapted to bear on base 1 and close the passage between the lower portions of the guards. The space between the upper portions of the guards can be closed by a shield 14.

Rod 11 has a lifting arm 15 supported in compartment 7 outside of the space between guards 10 and is preferably in the same plane with the gate. Another rod 16 is secured to and projects laterally from the gate, one of the projecting ends overlying the arm 15.

An opening 17 is formed in partition 6 back of opening 9 and has guard plates 18 extending from the sides thereof back into compartment 8. These guards extend from base 1 to top 5 and define a passage 19 which is normally closed at the back by a light gate 20, preferably of wire mesh and which is pivoted on a rod 21 at its upper end while its lower end bears on base 1, thereby holding the gate in an inclined position from which it can be raised easily by the pressure of a rodent from within the passage 19.

A pivot rod 22 extends across the passage 19 and is supported by the guards 18. On this rod are supported superposed tiltable plates 23 and 24 each of which is capable of a limited tilting movement relative to the other. The plate 23 is a resetting plate and has spaced resetting arms 25 extending therefrom. The arms are spaced apart so as to receive the gate 12 between them and they are extended under the ends of rod 16.

Plate 24 is the tripping plate and has an elongated arm 26 the end of which overlies gate 12 when said gate is in any position. Counterweight 13 is of sufficient weight to hold arm 26 in raised position. A bait finger or hook 27 is extended from the arm 26 and located in compartment 7 close to opening 17.

Both of the plates 23 and 24 with their arms 25 and 26 are nearly balanced on rod 22 and are freely tiltable in the passage 19.

A lid 28 is used for closing an opening in the top of compartment 7 and another opening, located over the passage 19, is normally closed by a basket 29 which is of wire mesh and hung within the passage. The top of the basket is closed by a plate 30. This basket can be used for suspending bait in the passage or, if preferred, bait B can be attached to the hook or finger 27.

In practice bait is placed on hook or finger 27 and/or in basket 29. A crank arm 31 at one end of rod 11 is pulled upwardly by a lifting wire or the like and will cause arm 15 to lift rod 16, gate 12 and arm 26 to the positions shown by full lines in Figure 2. To raise the gate it is necessary that arms 25 lift rod 16. The counterbalanced gate 12 will stay raised or open and will hold plate 24 tilted downwardly and rearwardly while arms 25 will drop by gravity and bring plate 23 to the full line position shown.

A rodent entering opening 9 will pass under the raised gate 12 and when it pulls on bait B on finger 27, the arm 26 will be swung downwardly, thereby overbalancing gate 12 and causing it to close. Should the rodent endeavor to reach bait in basket 29 it would either press down on arm 26 or on plate 24. In either case the gate 12 would be closed.

Finding itself trapped the rodent endeavors to escape by the gate 20. To reach this door the rodent must pass over plates 23 and 24 and as it reaches the gate 20 to push it open, it depresses both tiltable plates. This causes arm 26 to move upwardly away from gate 12 and the arms 25 to push upwardly on the ends of the rod 16. Thus as the rodent passes under the opened gate 20 into compartment 8, said gate will drop shut behind it while, at the same time, the door 12 will be swung open. Thus the trap is reset and ready to receive another rodent.

What is claimed is:

1. A trap including a receiving compartment, a bait compartment having an outlet into the receiving compartment and an inlet, guards at the sides of the inlet and outlet, a counterbalanced gate pivotally mounted between the guards at the inlet, a pivoted gate normally closed by gravity between the guards at the outlet, a tripping plate and a resetting plate tiltably mounted in superposed relation between the guards at the outlet, a bait carrying arm extending from the tripping plate and overlying the inlet gate, a resetting arm on the resetting plate, and means on the inlet gate and overlying the resetting arm for actuation by said arm to open the inlet gate.

2. A trap including a receiving compartment, a bait compartment having an outlet into the receiving compartment and an inlet, a counterbalanced gate pivotally mounted at the inlet, a pivoted gate normally closed by gravity at the outlet, a tripping plate and a resetting plate tiltably mounted in superposed relation at the outlet, a bait carrying arm extending from the tripping plate and overlying the inlet gate, a resetting arm on the resetting plate, and means on the inlet gate and overlying the resetting arm for actuation by said arm to open the inlet gate.

3. A trap including a receiving compartment, a bait compartment having an outlet into the receiving compartment and an inlet, a counterbalanced gate pivotally mounted at the inlet, a pivoted gate normally closed by gravity at the outlet, a tripping plate and a resetting plate tiltably mounted in superposed relation at the outlet, a bait carrying arm extending from the tripping plate and overlying the inlet gate, a resetting arm on the resetting plate, and means on the inlet gate and overlying the resetting arm for actuation by said arm to open the inlet gate, a lifting arm mounted to swing relative to the inlet gate, means for actuating said arm, and means on the gate for engagement by the arm to open the gate.

4. A trap including a receiving compartment, a bait compartment having an outlet into the receiving compartment and an inlet, a counterbalanced gate pivotally mounted at the inlet, a pivoted gate normally closed by gravity at the outlet, a tripping plate and a resetting plate tiltably mounted in superposed relation at the outlet, a bait carrying arm extending from the tripping plate and overlying the inlet gate, a resetting arm on the resetting plate, and means on the inlet gate and overlying the resetting arm for actuation by said arm to open the inlet gate.

LIGHTLE J. CHEEK.